US012158243B2

(12) United States Patent
De Combarieu et al.

(10) Patent No.: US 12,158,243 B2
(45) Date of Patent: Dec. 3, 2024

(54) SEALED AND THERMALLY INSULATING TANK HAVING INTER-PANEL INSULATING INSERTS

(71) Applicant: GAZTRANSPORT ET TECHNIGAZ, Saint Remy les Chevreuse (FR)

(72) Inventors: Guillaume De Combarieu, Saint Remy les Chevreuse (FR); Benoît Morel, Saint Remy les Chevreuse (FR); Ronan Le Bihan, Saint Remy les Chevreuse (FR); Jean-Damien Capdeville, Saint Remy les Chevreuse (FR); Charles Gimbert, Saint Remy les Chevreuse (FR); Raphaël Prunier, Saint Remy les Chevreuse (FR)

(73) Assignee: Gaztransport et Technigaz (FR)

( * ) Notice: Subject to any disclaimer, the term of this patent is extended or adjusted under 35 U.S.C. 154(b) by 374 days.

(21) Appl. No.: 17/634,068

(22) PCT Filed: Aug. 9, 2019

(86) PCT No.: PCT/FR2019/000131
§ 371 (c)(1),
(2) Date: Feb. 9, 2022

(87) PCT Pub. No.: WO2021/028625
PCT Pub. Date: Feb. 18, 2021

(65) Prior Publication Data
US 2022/0349523 A1 Nov. 3, 2022

(51) Int. Cl.
*F17C 3/02* (2006.01)
*B63B 25/16* (2006.01)
(Continued)

(52) U.S. Cl.
CPC .............. *F17C 3/027* (2013.01); *B63B 25/16* (2013.01); *B63B 27/34* (2013.01); *F17C 3/08* (2013.01);
(Continued)

(58) Field of Classification Search
CPC .... F17C 3/00; F17C 3/02; F17C 3/025; F17C 3/027; F17C 3/08; F17C 2201/0157;
(Continued)

(56) References Cited

U.S. PATENT DOCUMENTS 474,753 A 5/1892 Minard
4,747,513 A 5/1988 Betille et al.
(Continued)

FOREIGN PATENT DOCUMENTS

FR 2599468 A1 12/1987
FR 2691520 A1 11/1993
(Continued)

OTHER PUBLICATIONS

Korean Office Action with Translation from corresponding KR Application No. 10-2022-7007121 issued Jan. 29, 2024.
(Continued)

*Primary Examiner* — Lars A Olson
(74) *Attorney, Agent, or Firm* — Calderon Safran & Wright P.C.; Corinne Marie Pouliquen

(57) ABSTRACT

The invention relates to a sealed and thermally insulating tank wall comprising a thermally insulating barrier defining a support surface for a sealing membrane, the thermally insulating barrier comprising two adjacent insulating panels jointly delimiting an inter-panel space, the tank wall further comprising an insulating insert arranged in the inter-panel space so as to fill the inter-panel space, the insulating insert comprising an insulating core at least partially covered by a wrapper, the insulating core comprising layered glass wool,
(Continued)

the layered glass wool comprising laps of fibers superposed in a direction of layering, the insulating insert being arranged in the inter-panel space in such a way that the direction of layering of the layered glass wool is parallel to a widthwise direction of the inter-panel space.

35 Claims, 8 Drawing Sheets

(51) Int. Cl.
*B63B 27/34* (2006.01)
*F17C 3/08* (2006.01)

(52) U.S. Cl.
CPC ................. *F17C 2201/0157* (2013.01); *F17C 2203/035* (2013.01); *F17C 2203/0358* (2013.01); *F17C 2209/227* (2013.01); *F17C 2221/033* (2013.01); *F17C 2223/0161* (2013.01); *F17C 2260/033* (2013.01); *F17C 2270/0107* (2013.01)

(58) Field of Classification Search
CPC ........ F17C 2203/035; F17C 2203/0358; F17C 2270/0107; B63B 25/00; B63B 25/16; B63B 27/00; B63B 27/34
USPC ........................................................ 114/74 A
See application file for complete search history.

(56) References Cited

U.S. PATENT DOCUMENTS

| | | | |
|---|---|---|---|
| 5,586,513 | A | 12/1996 | Jean et al. |
| 8,663,773 | B2 | 3/2014 | Jang et al. |
| 9,518,700 | B2 | 12/2016 | Herry et al. |
| 9,982,839 | B2 | 5/2018 | Herry et al. |
| 10,267,455 | B2 | 4/2019 | Sassi et al. |
| 10,317,012 | B2 | 6/2019 | Ducoup et al. |
| 2005/0031843 | A1 | 2/2005 | Robinson et al. |
| 2021/0062972 | A1 | 3/2021 | Jean et al. |

FOREIGN PATENT DOCUMENTS

| | | | |
|---|---|---|---|
| FR | 2724623 | A1 | 3/1996 |
| JP | H04194498 | A | 7/1992 |
| JP | 2004084293 | A | 3/2004 |
| JP | 2006137421 | A | 6/2006 |
| JP | 2006527152 | A | 11/2006 |
| JP | 2014193736 | A | 10/2014 |
| JP | 2015134931 | A | 7/2015 |
| JP | 2017515010 | A | 6/2017 |
| JP | 2018115496 | A | 7/2018 |
| KR | 200189252 | | 5/2000 |
| KR | 20130125548 | A | 11/2013 |
| KR | 1020190088708 | | 7/2019 |
| WO | WO2014057221 | A2 | 4/2014 |
| WO | WO2014128414 | A1 | 8/2014 |
| WO | WO2019043347 | A1 | 3/2019 |
| WO | WO2019155157 | A1 | 8/2019 |
| WO | WO2019155158 | A1 | 8/2019 |

OTHER PUBLICATIONS

Japanese Office Action with Translation from corresponding JP Application No. 2022-507784 issued Mar. 28, 2023 (15 pages).
English Language Translation of JP2004084293A (6 pages).
English Language Translation of JP2014193736A (7 pages).
English Language Translation of JP2015134931A (24 pages).
English Language Translation of JP 2017-515010 A (30 pages).
English Language Translation of JP2018115496A (7 pages).
English Language Translation of KR20130125548A (7 pages).

SEALED AND THERMALLY INSULATING TANK HAVING INTER-PANEL INSULATING INSERTS

CROSS-REFERENCE TO RELATED APPLICATIONS AND CLAIM TO PRIORITY

This application is a national stage application of International Application No. PCT/FR2019/000131 filed Aug. 9, 2019, the disclosures of which is incorporated herein by reference and to which priority is claimed.

FIELD OF THE INVENTION

The invention relates to the field of sealed and thermally insulating tanks with membranes. In particular, the invention relates to the field of sealed and thermally insulating tanks for storing and/or transporting low-temperature liquids such as tanks for transporting liquefied petroleum gas (also referred to as LPG) at, for example, a temperature of between −50° C. and 0° C., or for transporting liquefied natural gas (LNG) at around −162° C. at atmospheric pressure. These tanks can be installed on land or on a floating structure. In the case of a floating structure, the tank may be intended for transporting liquefied gas or for receiving liquefied gas used as fuel for the propulsion of the floating structure.

BACKGROUND OF THE INVENTION

A wall structure for creating the planar wall of a sealed and thermally insulating tank has been described, for example in document FR2724623 or document FR2599468. Such a tank wall comprises a multilayered structure comprising, from the outside of the tank to the inside of the tank, a secondary thermally insulating barrier, a secondary sealing membrane, a primary thermally insulating barrier and a primary sealing membrane which is intended to be in contact with the liquid contained in the tank. Such tanks comprise insulating panels juxtaposed in such a way as to form the thermally insulating barriers. Further, to ensure the continuity of the insulating characteristics of said thermally insulating barriers, insulating seals are inserted between two insulating panels.

Document JP04194498 describes a sealed and thermally insulating tank for storing and transporting cryogenic liquid, comprising a thermally insulating barrier made up of insulating panels juxtaposed in a regular pattern. A flat insulating feel is arranged between two adjacent insulating panels to prevent the phenomena of gaseous convection between the two adjacent insulating panels. Such a flat insulating seal is made up of an insulating core surrounded by a sealed bag made of plastic film. Such a flat insulating seal is inserted into the inter-panel space in a vacuum-packed compressed state and the sealed bag is pierced after insertion so as to allow the flat insulating seal to expand and occupy all of the space between the two panels that form the inter-panel space.

SUMMARY OF THE INVENTION

Th applicant has observed that insulating seals such as those in accordance with documents FR2724623 or FR2599468 are difficult to house in said inter-panel space. Further, these insulating seals are unable to ensure that such insulating seals optimally fill all of the inter-panel space. Thus, such insulating seals are unable reliably to ensure the continuity of the insulation in the thermally insulating barriers which means that spaces prone to convection phenomena may be present in the thermally insulating barriers.

The applicant has also noticed that a flat insulating seal such as that according to document JP04194498 allows good insertion of the flat insulating seal into the inter-panel space and good occupation of said inter-panel space but that such a flat insulating seal may, with extended use, give rise to the presence of a passage encouraging natural convection. Specifically, when the tank is cooled down, the thermal contraction behavior of the flat insulating seal is determined by the bag made of plastic film. Now, such a bag made of plastic film has a coefficient of thermal contraction that is higher than the coefficient of thermal contraction of the insulating panels. Thus, the applicant has noticed that these flat insulating seals contract more than the inter-panel space in which they are housed and that this contraction results in a void separating the flat insulating seal from the faces of the panels that delimit the inter-panel space. Such a void encourages convection phenomena and is detrimental to the insulating characteristics of the thermally insulating barrier.

One idea behind the invention is that of providing a tank wall for the manufacture of a sealed and thermally insulating tank that does not exhibit these disadvantages. One idea behind the invention is that of providing a sealed and thermally insulating tank wall wherein an insulating insert fills the inter-panel space between two adjacent panels of a thermally insulating barrier reliably and without generating a void in said inter-panel space while the tank is being used.

In order to do that, the invention provides a sealed and thermally insulating tank wall comprising a thermal insulating barrier defining a planar support surface and a sealing membrane resting on said planar support surface of the thermally insulating barrier,

- the thermally insulating barrier comprising a plurality of insulating panels juxtaposed in a regular pattern, mutually facing lateral faces of two adjacent insulating panels jointly delimiting an inter-panel space separating said two adjacent insulating panels,
- the tank wall further comprising an insulating insert arranged in the inter-panel space so as to fill said inter-panel space, said insulating insert comprising an insulating core at least partially covered by a wrapper,
- at least a central portion of said insulating core comprising layered glass wool, said layered glass wool comprising laps of fibers superposed in a direction of layering, the insulating insert being arranged in the inter-panel space in such a way that the direction of layering of said central portion is parallel to a widthwise direction of the inter-panel space, namely the direction in which the two mutually facing lateral faces are spaced apart.

Such a tank wall exhibits good insulating characteristics of the thermally insulating barrier. In particular, such a tank wall exhibits a thermally insulating barrier that provides continuous insulation whatever the state of filling of the tank.

More particularly, the wrapper surrounding the insulating core of the insulating insert exhibits a low coefficient of friction allowing said insulating insert to be inserted simply and reliably into all of the inter-panel space. This insertion is made easier by the orientation of the layered glass wool of the central portion of the insulating core, which allows good compression of the insulating core in the widthwise direction of the inter-panel space, for inserting it. Specifically, such an arrangement of the glass wool allows good and simple compression of the insulating core in the widthwise direction of the inter-panel space so that it can be inserted into the inter-panel space. This arrangement of the layered glass wool also allows the insulating core to expand quickly and easily after the insulating insert has been inserted into the inter-panel space, thus allowing optimal filling of the inter-panel space.

Furthermore, this wrapper preferably has a contraction behavior similar to the behavior of the insulating core so that the insulating insert does not deform irregularly, for example by becoming wavy, and conforms to the dimensions of the inter-panel space whatever the level of filling of the tank.

According to embodiments, such a wall may comprise one or more of the following features.

According to one embodiment, the direction of layering of the layered glass wool constituting the central portion of the insulating core is perpendicular to at least one of the mutually facing lateral faces of the two adjacent insulating panels delimiting the inter-panel space.

According to one embodiment, the mutually facing lateral faces of the two adjacent insulating panels delimiting the inter-panel space are parallel.

According to one embodiment, the laps of fibers of the layered glass wool constituting the central portion of the insulating core are parallel to the faces of the adjacent insulating panels delimiting the inter-panel space.

The direction referred to as the length of the insulating core or length of the insulating insert extends in a lengthwise direction of the inter-panel space. According to one embodiment, the insulating core also comprises, at least at one of the longitudinal ends of the central portion, at least an end portion comprising layered glass wool, said end portion comprising laps of fibers superposed in a direction of layering parallel to the lengthwise direction of the insulating insert.

According to one embodiment, the insulating insert also comprises, at least at one of the longitudinal ends, at least one end piece comprising layered glass wool comprising laps of fibers superposed in a direction of layering parallel to the lengthwise direction of the insulating insert, said end piece being separated from the insulating core by the wrapper.

According to one embodiment, the insulating core comprises at least one separator extending in a plane perpendicular to a thickness direction of the tank wall, said separator separating the layered glass wool into a plurality of layered glass wool sections aligned in said thickness direction of the tank.

According to one embodiment, the insulating core comprises a plurality of separators separating the layered glass wool into a plurality of layered glass wool sections aligned in the thickness direction of the tank wall.

According to one embodiment, said separators are spaced apart by 5 to 20 cm in the thickness direction of the tank wall.

According to one embodiment, one or of such separators are made of kraft paper.

According to one embodiment, the separator or separators are bonded to the glass wool sections that said separator or separators separate.

According to one embodiment, the separator or separators extend in the widthwise direction of the inter-panel space over a distance less than the thickness of the insulating insert considered in said widthwise direction of the inter-panel space.

By virtue of these features, the insulating insert exhibits a rigidity in the thickness direction that allows it to be compressed uniformly in order to be inserted into the inter-panel space. Further, such separators provide a head loss in the thickness direction of the tank wall that limits convection through the layered glass wool in the tank wall.

According to one embodiment, the insulating core comprises a layered glass wool exhibiting a density of between 20 and 45 kg/m3.

According to one embodiment, the central portion of the insulating core comprises a first insulating layer of layered glass wool and a second insulating layer of layered glass wool, the first insulating layer and the second insulating layer being superposed in the widthwise direction of the inter-panel space, the layered glass wool of the first and the second insulating layers exhibiting a direction of layering parallel to the widthwise direction of the inter-panel space, the first insulating layer and the second insulating layer being separated by a separating lap extending parallel to the faces of the two insulating panels.

According to one embodiment, the layered glass wool of the first insulating layer exhibits a direction of layering parallel to the widthwise direction of the inter-panel space.

According to one embodiment, the layered glass wool of the second insulating layer exhibits a direction of layering parallel to the widthwise direction of the inter-panel space.

According to one embodiment, the layered glass wool of the first insulating layer exhibits a density higher than the density of the layered glass wool of the second insulating layer.

According to one embodiment, the first insulating layer comprises a layered glass wool of a density of between 33 and 45 kg/m3.

According to one embodiment, the second insulating layer comprises a layered glass wool of a density of between 20 and 28 kg/m3.

According to one embodiment, the first insulating layer comprises at least one separator, preferably made of kraft paper, separating the layered glass wool of said first layer into a plurality of layered glass wool sections aligned in the thickness direction of the tank wall.

According to one embodiment, the separating lap is made of glass fabric or kraft paper.

According to one embodiment, the separating lap is smaller than the insulating layers in the lengthwise and widthwise directions of the insulating core. This feature avoids the separating lap interfering with the compressibility of the insulating core at the time of insertion.

By virtue of these features, one insulating layer, for example the first insulating layer, can be dedicated to providing the insulating insert with good rigidity, and one insulating layer, for example the second insulating layer, can be dedicated to allowing controlled deformation of the insulating insert in the thickness direction thereof to facilitate its insertion into the inter-panel space.

According to one embodiment, the wrapper completely surrounds the insulating core.

According to another embodiment, the wrapper partially surrounds the insulating core.

According to one embodiment, the wrapper comprises a plurality of wrapper portions bonded to one another and/or bonded to the insulating core.

According to one embodiment, the various adjacent wrapper portions exhibit one or more regions of overlap, overlapping or being overlapped by a region of overlap belonging to an adjacent wrapper portion.

According to one embodiment, the various adjacent wrapper portions are assembled by bonding at their regions of overlap.

According to one embodiment, at least a portion of the wrapper comprises a material selected from kraft paper, sheets of polymer, sheets of composite including mineral fibers and a polymer matrix, composite sheets including mineral fibers bonded to a sheet of paper or of polymer, and combinations thereof.

According to another embodiment, at least a portion of the wrapper comprises a material selected from sheets of polymer, composite sheets including mineral fibers and a polymer matrix, composite sheets including mineral fibers bonded to a sheet of paper or of polymer, and combinations thereof. In this case, the wrapper can be manufactured in the form of an assembly of several portions obtained by cutting out from one or more of the sheet materials from the above list. Each portion is designed to cover a respective part of the insulating core and to be assembled with the other portions, for example by bonding, to form the wrapper. According to one embodiment, at least 40% of the surface area of the wrapper comprises sheet materials chosen from sheets of polymer, composite sheets including mineral fibers and a polymer matrix, composite sheets including mineral fibers bonded to a sheet of paper or of polymer, and combinations thereof.

According to one embodiment, the wrapper is not formed entirely from kraft paper assembled by bonding. According to another embodiment, no portion of the wrapper is made of kraft paper.

According to one embodiment, the wrapper comprises planar wrapper portions extending perpendicular to the widthwise direction of the inter-panel space on each side of the insulating core.

According to one embodiment, all, or part of the wrapper, notably at least one of the planar wrapper portions comprises a composite sheet comprising mineral fibers and a polymer matrix. This feature gives the wrapper good dimensional stability with respect to moisture.

According to one embodiment, the mineral fibers are in the form of a fabric or of a mat.

According to one embodiment, the fabric or mat of mineral fibers is impregnated or coated with the polymer matrix.

According to one embodiment, the polymer matrix with which the fabric or mat of mineral fibers is impregnated or coated is selected from the group consisting of solvated adhesives, polyurethanes, silicones, rubbers, epoxides, and polyester. Other resins may be used, for example polyamide, polyimide, polyetherimide or other thermoplastics.

According to one embodiment, the polymer matrix comprises a sheet of polymer covering the mineral fibers on at least one of the two faces of the fabric or mat of mineral fibers.

According to one embodiment, the composite sheet is covered, for example on an exterior or interior side of the wrapper, fully or partially, with a sheet of polymer or, if the composite sheet already comprises a sheet of polymer, with another sheet of polymer. For example, the sheet of polymer, or the other sheet of polymer, is bonded to the composite sheet. This embodiment makes it possible to mitigate against a potential lack of fluid-tightness of the composite sheet, thus giving the wrapper the necessary fluid-tightness when the insulating insert is subjected to a vacuum pressure in order to insert it into the inter-panel space.

According to one embodiment, the composite sheet is covered, for example on an exterior or interior side of the wrapper, fully or partially, with a sheet of paper or, if the composite sheet already comprises a sheet of paper, with another sheet of paper. For example, the sheet of paper is bonded to the composite sheet. The paper is, for example, kraft paper. If the sheet of composite material is not sufficiently fluid-tight, the sheet of paper increases the fluid-tightness of the wrapper to the level required for subjecting the insulating insert to a vacuum pressure in order to insert it into the inter-panel space. Further, the paper allows the insulating seal to slip more easily into the inter-panel space when it is being fitted.

According to one embodiment, the sheet of polymer covering the mineral fibers is bonded to said fabric or mat of mineral fibers using a thermofusing or spot bonding method.

According to one embodiment, the sheet of polymer covering the fabric or mat of mineral fibers or the composite sheet is made from a resin selected from the group consisting of polyethylene, polypropylene, polyethylene terephthalate and polyvinyl chloride.

According to one embodiment, the mineral fibers are selected from the group consisting of glass fibers and basalt fibers.

According to one embodiment, the sheet of polymer exhibits a surface density of between 10 and 100 g/m$^2$, preferably between 20 and 40 g/m$^2$.

According to one embodiment, the polymer matrix exhibits a density of between 0.8 and 1.4.

According to one embodiment, at least one of the planar wrapper portions comprises kraft paper.

According to one embodiment, the wrapper comprises an edge-face wrapper portion extending in the widthwise direction of the inter-panel space between the planar wrapper portions situated on each side of the insulating core, said edge-face wrapper portion being located along all or part of the perimeter of the insulating core.

According to one embodiment, the edge-face portion comprises rectilinear edge-face portions and corner edge-face portions.

According to one embodiment, the edge-face portion comprises kraft paper.

According to one embodiment, the kraft paper used in the edge-face wrapper portion is adhesive.

According to one embodiment, the kraft paper used for at least one of the planar wrapper portions and/or at least one of the edge-face wrapper portions exhibits a grammage of between 60 and 150 g/m$^2$ and preferably between 70 and 100 g/m$^2$.

According to one embodiment, the edge-face portion comprises a sheet of polymer.

According to one embodiment, the sheet of polymer is adhesive.

According to one embodiment, the wrapper has fluid-tightness exhibiting a leakage rate configured to allow the insulating insert to be compressed by vacuum pressure under the effect of a suction system, for example of the vacuum pump or vacuum generator type employing a Venturi system.

According to one embodiment, the difference in coefficient of thermal contraction between the coefficient of thermal contraction of the insulating core and the coefficient of thermal contraction of the wrapper is less than or equal to $15\times10^{-6}$/K.

According to one embodiment, the coefficient of thermal contraction of the insulating core is between $5\times10^{-6}$/K and $10\times10^{-6}$/K.

According to one embodiment, the coefficient of thermal contraction of the wrapper is between $5\times10^{-6}$/K and $20\times10^{-6}$/K.

By virtue of these features, the compression of the wrapper as it contracts under the effect of cold does not significantly compress the insulating core. In particular, there is no risk of this compression deforming the insulating core to the point that said insulating core adopts a wavy shape, as such a wavy shape could generate voids that encourage convection.

According to one embodiment, the insulating panels of the thermally insulating barrier comprise blocks of polyurethane foam.

According to one embodiment, the invention also provides a method for manufacturing a sealed and thermally insulating tank wall, said method comprising the steps of:

- providing a sealed and thermally insulating tank wall thermally insulating barrier, said thermally insulating barrier comprising a plurality of insulating panels juxtaposed in a regular pattern, the mutually facing lateral faces of two adjacent insulating panels delimiting an inter-panel space separating said two adjacent insulating panels,
- providing a parallelepipedal insulating insert comprising an insulating core, said insulating insert comprising a wrapper completely covering the insulating core,
- inserting a suction nozzle of a suction system into the insulating insert through an orifice in the wrapper,
- applying a vacuum pressure in the insulating insert so as to reduce the thickness of said insulating insert through vacuum pressure,
- inserting the insulating insert into the inter-panel space while maintaining the suction of the suction system in order to maintain the vacuum pressure during the step of inserting said insulating insert into the inter-panel space,
- when the insulating insert has been inserted into the inter-panel space, removing the suction nozzle from the insulating insert so that the interior space of the wrapper is in communication with ambient pressure via the orifice in the wrapper.

By virtue of these features, the insulating insert is simple and quick to insert into the inter-panel space. In particular, maintaining the vacuum pressure in the insulating insert as it is being inserted into the inter-panel space allows the insulating insert to be kept in a compressed form, the insulating insert thus maintaining a reduced thickness as a result of its compression, thereby making it easier to insert into the inter-panel space.

Further, simply removing the suction nozzle of the suction system allows the internal space of the wrapper to be placed in communication with the external environment, thus allowing the insulating core to expand without the need for an additional operation once the insulating insert is in position in the inter-panel space. Depending on the embodiment, such a method for manufacturing a tank wall may comprise one or more of the following features.

According to one embodiment, the reduction in thickness of the insulating insert is such that the insulating insert exhibits a thickness smaller than the width of the inter-panel space.

According to one embodiment, the suction nozzle of the suction system is configured to puncture the wrapper of the insulating insert, the step of inserting the suction nozzle into the insulating insert comprising a step of puncturing the wrapper using said suction nozzle of the suction system.

Thus, the step of inserting the suction nozzle into the insulating insert is simple because it simply entails piercing the wrapper using said suction nozzle.

According to one embodiment, the suction nozzle comprises a flange, the step of inserting the suction nozzle of the suction system into the insulating insert comprising the step of bringing the flange to bear against the wrapper.

Thus, interaction between the suction nozzle and the wrapper occurs without significant leakage, allowing the suction system to create a vacuum pressure in the wrapper quickly and simply.

According to one embodiment, the insulating core of the insulating insert comprises at least a central portion of layered glass wool, said central portion of layered glass wool comprising a plurality of laps of fibers superposed in a direction of layering, and wherein the suction nozzle is inserted into the insulating insert at an edge face of the insulating insert.

According to one embodiment, the edge face via which the suction nozzle is inserted is parallel to the direction of layering of the layered glass wool.

According to one embodiment, the layered glass wool of the central portion of the insulating core is arranged in the parallelepipedal inserting insert in such a way that the laps of fibers are parallel to the long sides of said parallelepipedal insulating insert.

According to one embodiment, the insulating insert is inserted into the inter-panel space in such a way that the direction of layering of the glass wool of the central portion is parallel to a support surface formed by the insulating panels of the thermally insulating barrier.

According to one embodiment, the insulating insert is inserted into the inter-panel space in such a way that the direction of layering of the layered glass wool of the central portion is perpendicular to the lateral faces of the insulating panels delimiting the inter-panel space. In other words, the insulating insert is inserted into the inter-panel space in such a way that the laps of fibers of the layered glass wool of the central portion are parallel to said lateral faces of the insulating panels.

By virtue of these features, the laps of fibers of the layered glass wool of the central portion with the aforementioned direction of layering do not generate any significant head loss during the step of creating the vacuum pressure by suction via the suction system, thus allowing the insulating insert to be compressed quickly and uniformly. Further, this insertion of the end of the nozzle of the suction system via a lateral face of the wrapper allows the insulating insert to be compressed without the need for too high a pumping flow rate by the suction system, thus limiting the risks of wrapper damage which are associated with too much suction detrimental to the compression of the insulating insert.

According to one embodiment, the insulating core comprises separators arranged parallel to the direction of layering of the central portion, the insulating insert being inserted into the inter-panel space in such a way as to arrange said separators parallel to the support surface formed by the thermally insulating barrier.

Such a method is also suitable for an insulating insert of which the core corresponds to the aforementioned embodiments, namely a core comprising one or more end portions, or an insert comprising one or more end pieces.

Such a method is suitable for an insulating insert of which the wrapper corresponds to the abovementioned embodiments, namely notably a wrapper of which at least one of the portions comprises kraft paper, possibly adhesive, and/or a polymer material, possibly adhesive, and/or a composite material comprising mineral fibers and a polymer matrix and/or a composite material comprising mineral fibers and a sheet of paper or of polymer. Specifically, such an insulating insert exhibits enough fluid-tightness to allow it to be compressed by vacuum pressure while offering an external surface that easily allows it to be inserted into the inter-panel space.

According to one embodiment, the insulating insert is inserted into the inter-panel space with a face through which the suction nozzle of the suction system passes facing toward the inside of the tank.

Thus, the step of inserting the insulating insert into the inter-panel space is not disturbed by the presence of the nozzle passing through a face of the insulating insert.

According to one embodiment, the wrapper exhibits a leakage flow rate less than the pumping flow rate of the suction system. In other words, the head losses across the wrapper which are due to the porosity of the materials, possible imperfect bonding where the various wrapper portions are joined together, and the leakage that may originate from the orifice made in the wrapper for inserting the suction nozzle are lower than the head losses created by the vacuum pump and its suction nozzle, making it possible to generate a vacuum pressure in the insulating insert.

Thus, the vacuum pressure allows the insulating insert to be compressed quickly and simply so that it can be inserted into the inter-panel space.

According to one embodiment, the suction system exhibits a pumping flow rate of between 8 $m^3$/h and 30 $m^3$/h, preferably 15 $m^3$/h.

According to one embodiment, wherein, in the insertion step, the insulating insert is guided into the inter-panel space by means of a rigid guide in the form of plates.

Such a rigid guide allows easier insertion of the insulating insert into the inter-panel space.

According to one embodiment, the method further comprises the step of cutting at least one of the lateral faces of the wrapper after the insulating insert has been inserted into the inter-panel space. Such cutting is performed for example in the form of a knife cut and allows better circulation of gas between adjacent insulating inserts in the thermally insulating barrier.

According to one embodiment, the suction system is a vacuum pump. According to one embodiment, the suction system is a vacuum generator using a Venturi system.

Such a tank wall may form part of an on-shore storage facility, for example for storing LNG, or may be installed in an inshore or off-shore floating structure, notably a methane carrier or any ship using a liquefied combustible gas as fuel, a floating storage and regasification unit (FSRU), a floating production storage and offloading (FPSO) unit or the like.

According to one embodiment, the invention provides a ship for transporting a cold liquid product comprises a double hull and a tank comprising the aforementioned sealing wall arranged in the double hull.

According to one embodiment, the invention also provides a method for loading or offloading such a ship, wherein a cold liquid product is conveyed through insulating pipelines from or to a floating or onshore storage facility to or from the tank of the ship.

According to one embodiment, the invention also provides a transfer system for a cold liquid product, the system comprising the aforementioned ship, insulated pipelines arranged in such a way as to connect the tank installed in the hull of the ship to a floating or on-shore storage facility and a pump for forcing a flow of cold liquid product through the insulated pipelines from or to the floating or on-shore storage facility to or from the tank of the ship.

BRIEF DESCRIPTION OF THE DRAWINGS

The invention will be better understood and further objects, details, features and advantages thereof will become more clearly apparent during the course of the following description of a number of particular embodiments of the invention, which are given purely by way of nonlimiting illustration and with reference to the attached drawings.

DETAILED DESCRIPTION OF THE PREFERRED EMBODIMENT(S)

A sealed and thermally insulating tank for storing and transporting a cryogenic fluid, for example liquefied natural gas (LNG) comprises a plurality of tank walls each having a multilayer structure.

Such sealed and thermally insulating tank walls exhibit, from the outside to the inside of the tank, a secondary thermally insulating barrier resting against a bearing structure, a secondary sealing membrane resting against the secondary thermally insulating barrier, a primary thermally insulating barrier resting against the secondary sealing membrane and a primary sealing membrane intended to be in contact with the liquefied gas contained in the tank.

The bearing structure may notably be a self-supporting metal sheet or, more generally, any type of rigid partition exhibiting suitable mechanical properties. The bearing structure may notably be formed by the hull or the double hull of a ship. The bearing structure comprises a plurality of walls defining the overall shape of the tank, usually a polyhedral shape.

Furthermore, the thermally insulating barriers may be produced in numerous ways, from numerous materials. Such thermally insulating barriers each comprise a plurality of insulating panels of parallelepipedal shape juxtaposed in a regular pattern. The insulating panels of these thermally insulating barriers jointly form planar support surfaces for the sealing membranes. Such insulating panels are, for example, made from blocks of polyurethane foam. Such insulating panels made of blocks of polyurethane foam may further comprise a top sheet and/or a bottom sheet, for example made of plywood.

By way of example, such tanks are described in patent applications WO14057221 or FR2691520.

Figure 1:
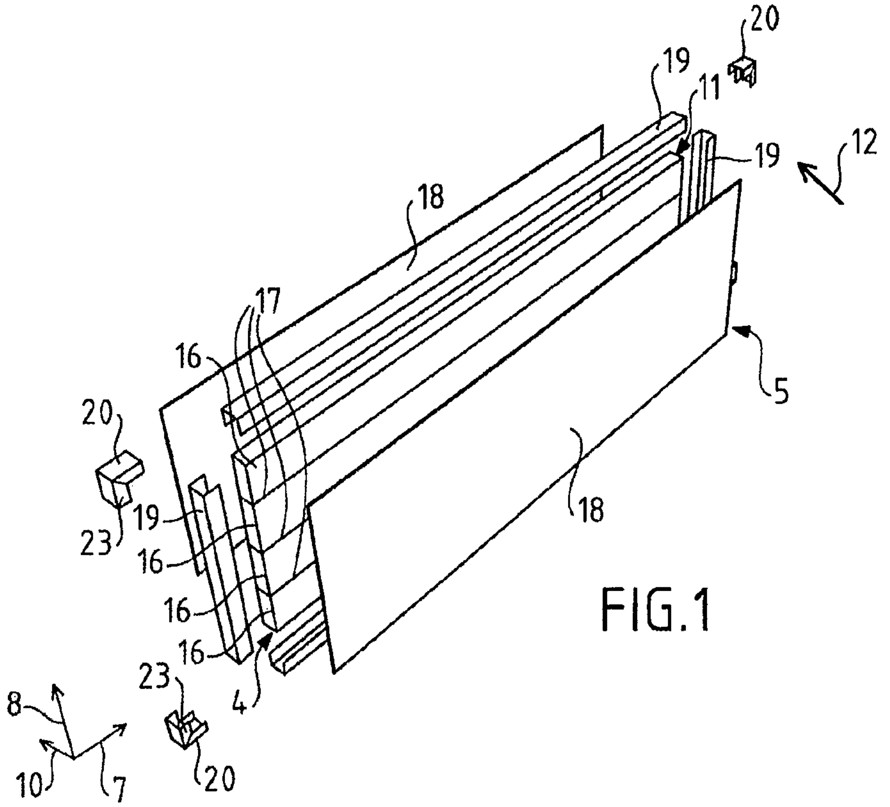
FIG. 1 is an exploded schematic perspective view of an insulating insert intended to be inserted between two insulating panels of a thermally insulating barrier of a sealed and thermally insulating tank.
Figure 2:
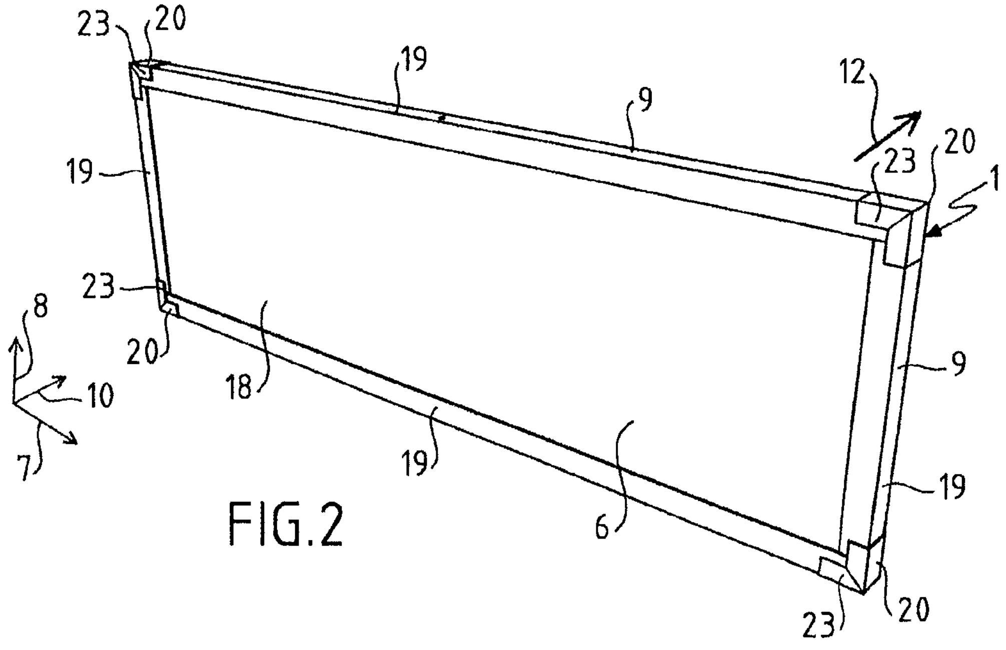
FIG. 2 is a schematic perspective view of the insulating insert of FIG. 1, in the assembled state.
Figure 3:
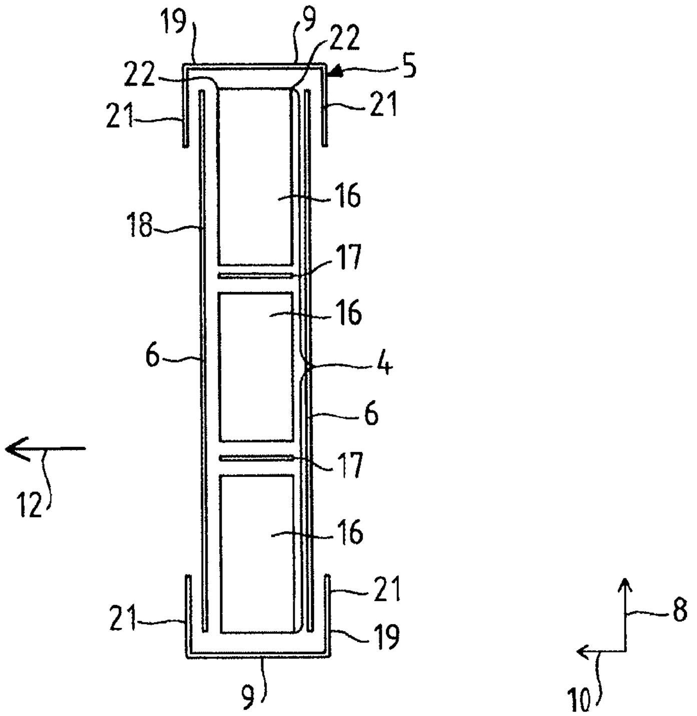
FIG. 3 is a schematic view in section of the insulating insert of FIG. 1.

The juxtaposition of the insulating panels to form a thermally insulating barrier generates the presence of inter-panel spaces between two adjacent insulating panels 3. In other words, an inter-panel space 2 separates the mutually facing lateral faces of two adjacent insulating panels 3 (see FIG. 7). To ensure the continuity of the insulation in the thermally insulating barrier, an insulating insert 1 is inserted into the inter-panel space 2 separating the two mutually facing lateral faces of the two adjacent insulating panels 3. FIGS. 1 to 3 illustrate such an insulating insert 1.

The insulating insert 1 comprises an insulating core 4 covered by a wrapper 5. This insulating insert 1 exhibits a parallelepipedal shape corresponding to the parallelepipedal shape of the inter-panel space 2 and defining the shape of the insulating insert 1. Thus, this insulating insert 1 comprises two planar large faces 6 which are parallel. These two planar large faces 6 define a lengthwise direction 7 of the insulating insert 1 and a widthwise direction 8 of the insulating insert 1. Edge faces 9 which extend in a thickness direction 10 of the insulating insert 1 connect the sides of the large faces 6.

The insulating core 4 has a central portion 11 made of glass wool. The glass wool employed is a layered glass wool, which is to say that the production method results in a mat of glass wool which is made up of multiple interlaid parallel laps visible to the naked eye which are superposed in a direction of layering 12. In other words, the fibers are very predominantly oriented in planes perpendicular to the direction of layering 12.

Figure 4:
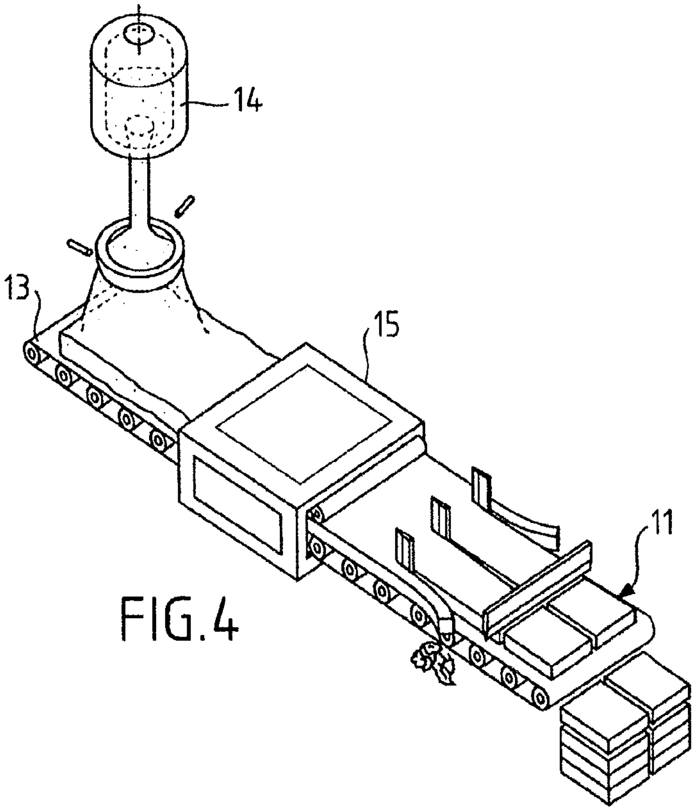
FIG. 4 is a schematic perspective view of a facility for manufacturing layered glass wool.

Such a layered glass wool can be obtained for example by a manufacturing method using a horizontal conveyor belt 13, illustrated schematically in FIG. 4. In such a manufacturing method, sand and crushed glass are melted in a furnace 14 the temperature of which is for example from 1300 to 1500° C. The molten sand and crushed glass are then converted into fibers by spinning using rapid rotation. A binder is added to these fibers and the entity thus obtained is received on the horizontal conveyor belt 13 to pass through a polymerization oven 15 intended to polymerize the binder. In that case, the fibers are essentially parallel to the conveyor belt 13. The direction of layering corresponds to the vertical direction in the production tool because the layering is the result of the effect of gravity. Other production methods for producing a layered glass wool are conceivable.

In the embodiment illustrated in FIGS. 1 to 3, the glass wool of the core 4 exhibits a density of 22 or 35 or 40 kg/m$^3$.

In this embodiment, the core 4 is made up entirely of its central portion 11 of glass wool layered in the direction 12. The core 4 comprises glass wool sections 16 separated by separators 17. Such separators 17 extend perpendicular to the widthwise direction 8 of the insulating insert 1. These separators 17 extend over the entire length 7 and through the entire thickness 10 of the insulating insert 1. The separators 17 are advantageously bonded to the glass wool sections 16 separated by said separators 17.

FIG. 1 thus illustrates a core 4 comprising four glass wool sections 16 separated in the widthwise direction 8 of the insulating insert 1 by three separators 17. FIG. 1 constitutes a preferred solution regarding the number of separators, namely the minimum number of separators in order not to have convection when the temperature gradient is higher than 100° C. FIG. 3 illustrates an embodiment variant in which the core 4 comprises three sections 16 separated in the widthwise direction 8 of the insulating insert 1 by two separators 17.

The glass wool is arranged in the core 4 in such a way as to exhibit a direction of layering 12 perpendicular to the width 8 of the insulating insert 1. In other words, the laps of fibers that make up the glass wool are arranged substantially parallel to the widthwise direction 8 of the insulating insert 1.

Figure 13:
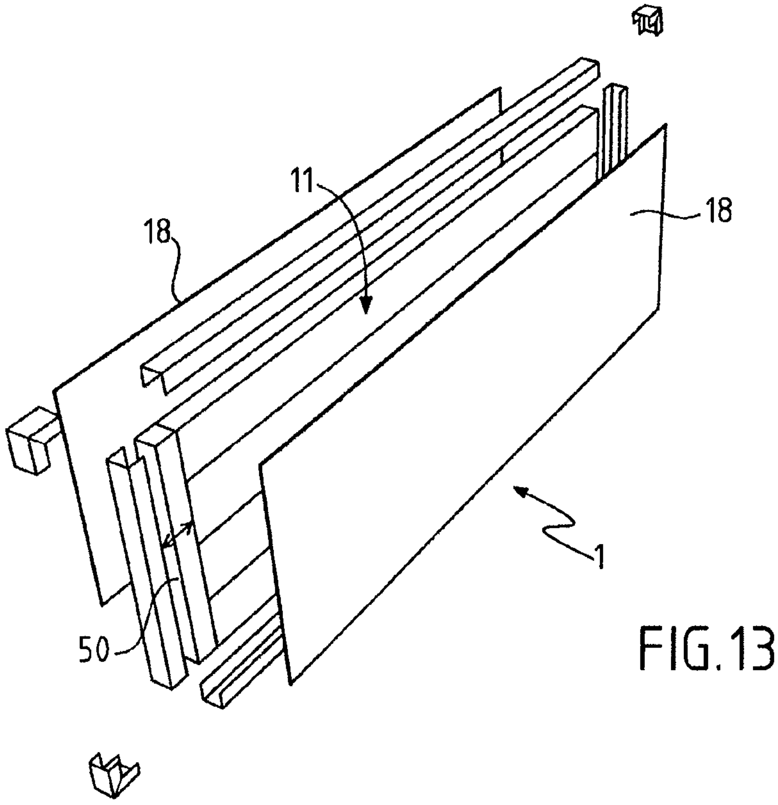
FIG. 13 is an exploded perspective view of one embodiment of the insulating insert, in which the core comprises a central portion and an end portion of layered glass wool.

As a preference, the glass wool is arranged in the core 4 with a direction of layering 12 parallel to the thickness direction 10 of the insulating insert 1, which is to say that the laps of fibers of the glass wool are substantially parallel to the large faces 6 of the insulating insert 1. In other words, the laps of fibers that make up the glass wool are arranged substantially parallel to the widthwise direction 8 and to the lengthwise direction 7 of the insulating insert 1. In an alternative embodiment shown in FIG. 13, the insulating core comprises, at least at one of the longitudinal ends of the central portion 11, an end portion 50 made of layered glass wool. This end portion, manufactured using the same method as the glass wool of the central portion 11, is also made up of superposed laps of fibers, but its direction of layering differs from that of the glass wool of the central portion 11: it is parallel to the lengthwise direction 7 of the insulating insert 1. Such an end portion gives the insulating core better longitudinal compressibility so that several insulating inserts 1 arranged end to end between two insulating panels 3 can be mounted perfectly contiguously. The end portion 50 may for example exhibit a dimension of 1 cm in the direction of its direction of layering, namely along the length of the insulating insert 1. This dimension may be reduced to 5 mm when the end portion 50 is evacuated, thanks to the compressibility its structure confers upon it in the lengthwise direction of the insulating insert 1.

Figure 15:
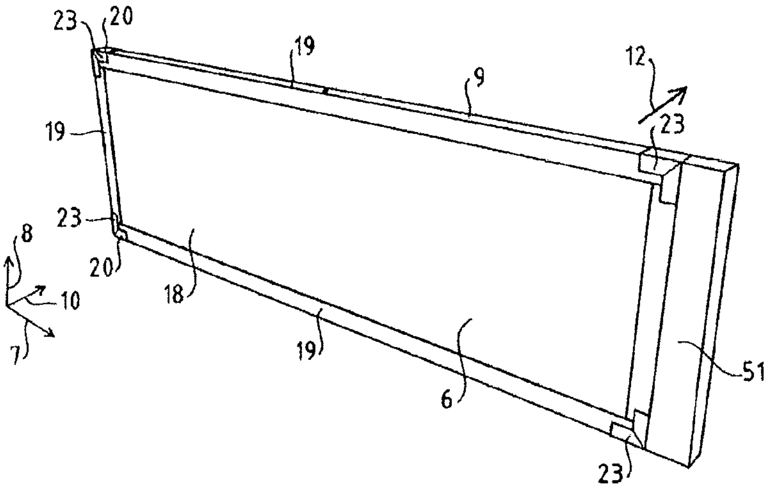
FIG. 15 is a schematic perspective view of the insulating insert comprising a core covered by a wrapper and an end portion of layered glass wool.

In another alternative embodiment, depicted in FIG. 15, the insulating insert 1 comprises an insulating core consisting only of a central portion 11 of layered glass wool like that described in the first embodiment, and covered by a wrapper 5, and the insulating core also comprises, at least at one of its longitudinal ends, an end piece 51 situated outside the wrapper 5. This end piece 51 is made of layered glass wool and exhibits the same technical features as the end portion 51 described hereinabove. Further, the glass wool of the end piece 50 exhibits a density of 20 or 35 or 40 kg/m$^3$.

As illustrated in FIG. 1, the wrapper 5 comprises a plurality of wrapper portions. More particularly, the wrapper 5 comprises planar wrapper portions 18, rectilinear edge-face wrapper portions 19 and corner edge-face wrapper portions 20. These wrapper portions 18, 19, 20 are fixed to the core 4, for example by bonding.

The planar wrapper portions 18 cover the core 4 and form the large faces 6 of the insulating insert 1. These planar wrapper portions 18 are of rectangular shape and have dimensions substantially identical to the dimensions of the core 4 on its large faces.

The rectilinear edge-face wrapper portions 19 comprise a central section of rectangular shape covering a corresponding edge face of the core 4. The central section forms a corresponding edge face 9 of the insulating insert 1. The rectilinear edge-face wrapper portions 19 also comprise, on each side of the central section, a return 21. These returns 21 extend from longitudinal sides of the central portion. These returns 21 extend parallel to a respective planar wrapper portion 18 so as to overlap an edge margin of said planar wrapper portion 18. These returns 21 are bonded to said edge margins of planar wrapper portions 18. In other words, the rectilinear edge-face wrapper portions 19 form an edge face 9 of the insulating insert 1 and also overlap the core 4 at the edge corners 22 that connect said edge face 9 and the large faces 6.

The corner edge-face wrapper portions 20 overlap the rectilinear edge-face wrapper portions 19 that form two adjacent edge faces 9 of the insulating insert 1. In other words, these corner edge-face wrapper portions 20 overlap the edges of the core 4 at the junction where two edge faces 9 of the insulating insert 1 meet. In a similar way to the returns 21 of the edge-face wrapper portions 19, the corner edge-face wrapper portions 20 have corner returns 23 extending parallel to and overlapping the ends of the returns 21 of the corresponding edge-face wrapper portions 19. The corner edge-face wrapper portions 20 are bonded to the edge-face wrapper portions 19 that they overlap.

Thus, the various wrapper portions 18, 19, 20 are bonded together and to the glass wool to form a continuous wrapper 5 completely surrounding the core 4. In an embodiment which has not been illustrated, the portions 18 and 19 placed on the bottom and the top may be produced as a single piece of kraft. In another embodiment, the wrapper 5 completely surrounds the core 4 without being bonded thereto.

In a first embodiment, the wrapper 5 is made of kraft paper. Such a kraft paper offers a low coefficient of friction, thus allowing the insulating insert 1 to slide into the inter-panel space 2 as it is being inserted into said inter-panel space 2. Furthermore, such a kraft paper has a coefficient of thermal contraction of the order of 5 to $20\times10^{-6}$/K. Thus, such a kraft paper exhibits a coefficient of thermal contraction similar to that of the insulating core 4 placed in the inter-panel space. Thus, the insulating insert 1 exhibits uniform behavior towards cold. Specifically, the insulating core 4 has no risk of deforming under the effect of compression associated with the thermal contraction of the wrapper 5. In particular, there is no risk of the insulating core 4 deforming to adopt a wavy shape under the effect of this compression, such a wavy shape generating within the inter-panel space 2 voids that encourage convection and are therefore detrimental to the insulating properties of the thermally insulating barrier.

The kraft paper of the wrapper 5 exhibits a grammage higher than 60 $g/m^2$ in order to avoid risks of the wrapper 5 tearing when the insulating insert 1 is being inserted into the inter-panel space. Further, this kraft paper exhibits a grammage lower than 150 $g/m^2$ so that the wrapper 5 retains enough flexibility to allow the insulating insert 1 to deform in compression, and preferably of between 70 and 100 $g/m^2$.

In an alternative embodiment, all, or certain parts of the wrapper 5, for example the planar wrapper portions 18, are sheets of composite material made up of a fabric or mat of mineral fibers, for example glass and basalt fibers, and of a polymer matrix. If appropriate, other parts of the wrapper 5, for example the edge-face portions 19, 20, may be made of a kraft paper with the same characteristics as the paper used for the wrapper described in the first embodiment. The kraft paper used for the edge-face portions 19, 20 may be adhesive.

Such a composite material possesses better dimensional stability than kraft paper as it is less sensitive to moisture. In addition, the use of a fabric or mat of mineral fibers in addition to the polymer matrix makes it possible to obtain a coefficient of thermal contraction similar to that of the glass wool, so that the behavior of the insulating insert 1 towards cold is uniform. Specifically, if the wrapper is made only of polymer material, there is a risk that it will have far greater dimensional variations than the glass wool during the temperature variations to which the wall of the tank is subjected, especially when this temperature gradient may reach high values in excess of 100° C. Now, it is possible to choose a fabric or mat of glass fibers that is such that the difference between its coefficient of thermal contraction and that of the glass wool is less than $5\times10^{-6}$ $K^{-1}$. Thus, in this embodiment, the mineral fiber fabric used to make the composite material of which the planar wrapper portions 18 are made may for example exhibit a coefficient of thermal contraction of the order of $10^{-5}$ $K^{-1}$ in the lengthwise direction whereas that of the glass wool of the central portion 11 of the insulating core is between $5\times10^{-6}$ $K^{-1}$ and $8\times10^{-6}$ $K^{-1}$ in the direction in which it is measured.

The polymer matrix may be incorporated into the composite sheet according to the following two examples. In the first example, the fabric of glass or basalt fibers is impregnated or coated with polymer matrix, the latter being selected from among solvated adhesives, polyurethane, silicone, rubber, epoxides, or the like. As a preference, the surface density of the composite sheet is between 50 and 400 $g/m^2$ and its thickness is between 25 and 500 μm.

In a second example, the fabric of glass or basalt fibers is covered with a sheet of polymer bonded, for example, using a spot bonding or fusion bonding method. This sheet of polymer may be a plastic resin selected from polyethylene, polypropylene, polyethylene terephthalate and polyvinyl chloride. The density of polymer matrix after drying is for example between 0.8 and 1.4. The thickness of the sheet of polymer may be between 25 and 50 μm, which corresponds to a surface density of, for example, between 20 and 40 $g/m^2$.

In another embodiment, all, or certain parts of the wrapper, for example the planar wrapper portions 18, are sheets of composite material made up of a fabric or mat of mineral fibers, for example glass and basalt fibers, bonded to a sheet of paper.

Figure 16:
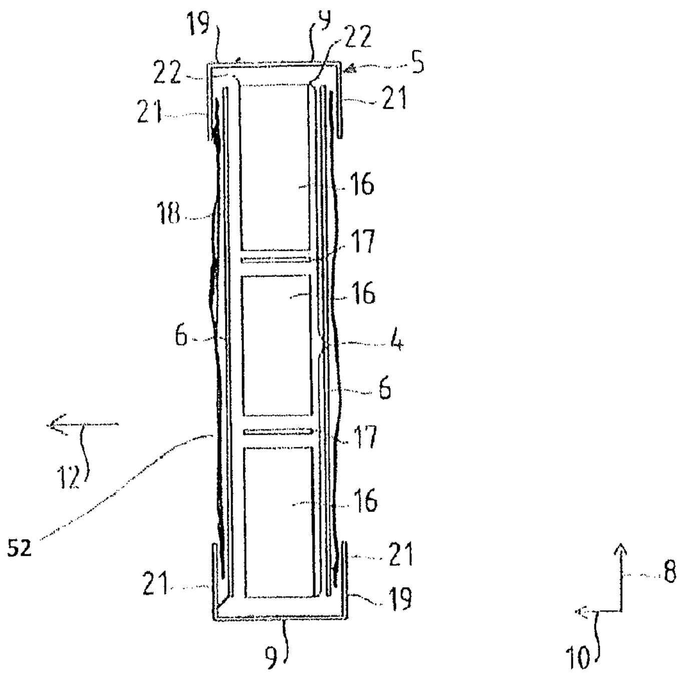
FIG. 16 is a view similar to FIG. 3 showing another embodiment of the wrapper.

In another embodiment illustrated in FIG. 16, the planar wrapper portions 18 are sheets of composite material comprising a fabric or mat of mineral fibers, for example glass and basalt fibers, and a polymer matrix. These composite sheets are covered with a sheet of paper 52 on their exterior face, namely the face oriented toward the insulating panel. In this embodiment, the sheet of paper 52 covering the composite sheet is bonded to the composite sheet that constitutes the planar wrapper portion 18, and the internal face of the return 21 is also bonded to the sheet of paper 52.

Relative fluid-tightness is enough for the method described hereinbelow to be able to be employed for inserting the insulating insert 1 into the inter-panel space. The composite sheet as described, where appropriate covered with a sheet of polymer or of paper in addition, allows this relative fluid-tightness to be obtained.

In another alternative embodiment, the planar wrapper portions 18 are made of composite material and the edge-face wrapper portions 19, 20 are made of adhesive tape. This allows the dimensional stability toward moisture, and the fluid-tightness of the wrapper, to be improved still further.

Figure 5:
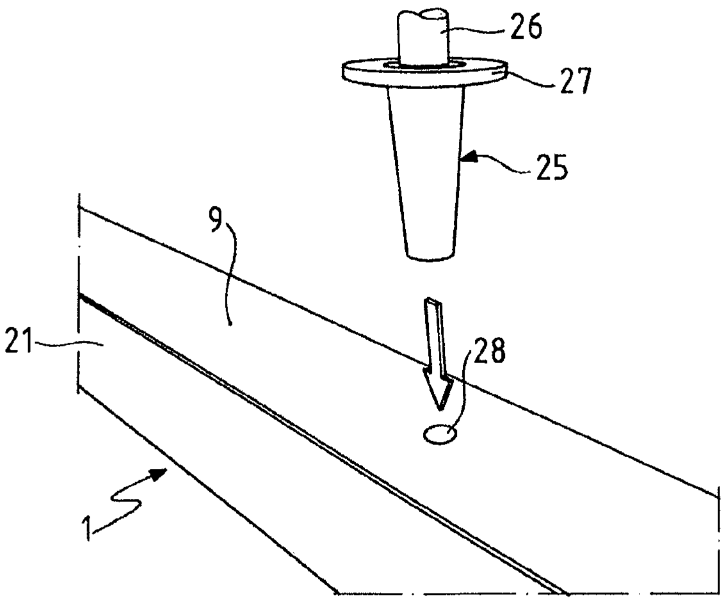
FIG. 5 is a schematic perspective view of a vacuum pump nozzle as it is being inserted into an insulating insert of FIG. 1.
Figure 6:
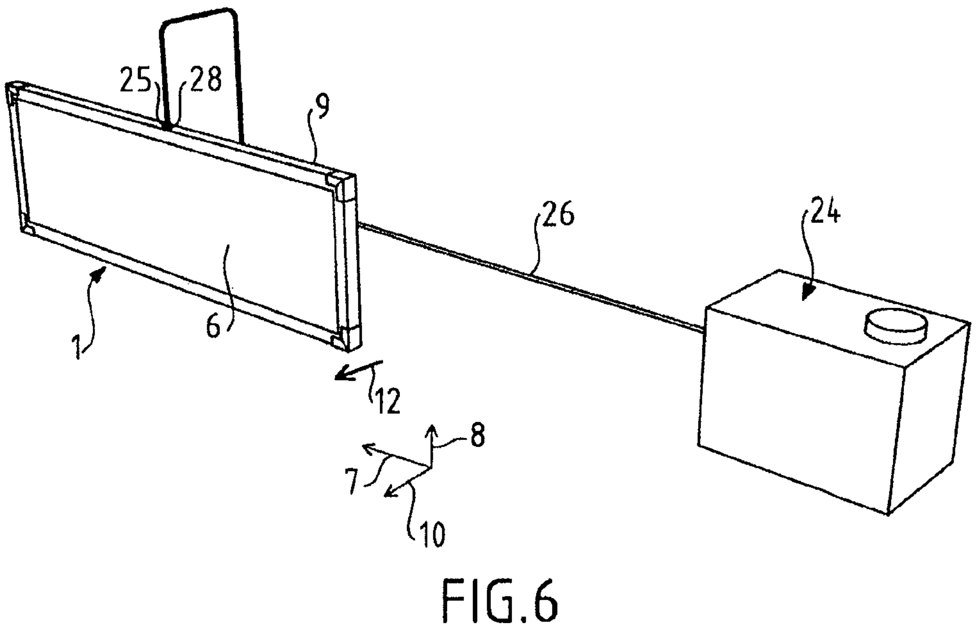
FIG. 6 is a schematic perspective view of the insulating insert of FIG. 2 associated with a vacuum pump, in which view the end of the vacuum pump nozzle is inserted in said insulating insert.
Figure 7:
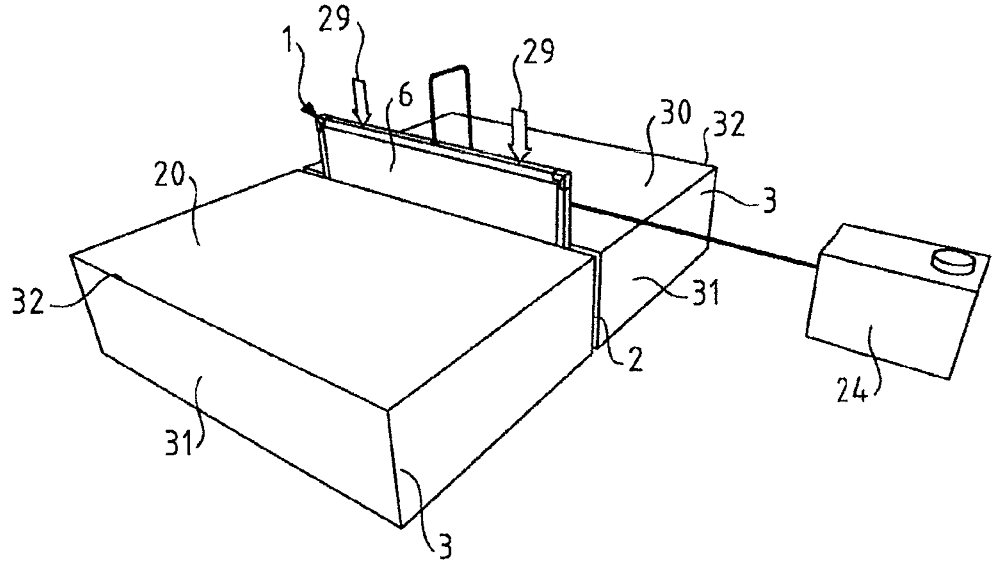
FIG. 7 is a schematic perspective view of the insulating insert of FIG. 5 as it is being inserted into the inter-panel space separating two adjacent panels of a thermally insulating barrier of a sealed and thermally insulating tank.

The method for inserting the insulating insert 1 into the inter-panel space is described hereinafter with reference to FIGS. 5 to 7.

First of all, an insulating insert 1 exhibiting the structure as described hereinabove with reference to FIGS. 1 to 3 is provided. This insulating insert 1 exhibits a shape that complements that of the inter-panel space 2, typically a parallelepipedal shape as described hereinabove.

This insertion method employs a suction system. Such a suction system is, in the remainder of the description and by way of example, a vacuum pump 24 as illustrated in FIGS. 6 and 7. In an embodiment which has not been illustrated, such a suction system is a vacuum generator using a Venturi system. Such a vacuum pump 24 is connected to a suction nozzle 25 via a pumping hose 26. This suction nozzle 25 exhibits a flange 27 of planar circular shape. The suction nozzle 25 exhibits a frustoconical shape so that it has an opposite end to the pumping hose 26 that is capable of puncturing the wrapper 5. Thus, the suction nozzle 25 and, more particularly, its puncturing end, is inserted into the insulating insert 1, puncturing the wrapper 5. This puncturing of the wrapper 5 generates a suction orifice 28 in the insulating insert 1.

The suction nozzle 25 is inserted into the insulating insert 1 through the wrapper 5 at an edge face 9 that is intended to face toward the inside of the sealed and thermally insulating tank.

As a preference, the suction nozzle 25 is inserted into the insulating insert 1 on an edge face 9 perpendicular to the direction of layering 12 of the glass wool of the central portion 11.

Furthermore, the suction nozzle 25 is inserted into the insulating insert 1 until the flange 27 is brought into contact with the wrapper 5.

Once the suction nozzle 25 has been inserted into the insulating insert 1 and correctly positioned, which is to say once the flange 27 is in contact with the wrapper 5, the vacuum pump 24 is actuated in order to generate a vacuum pressure in the insulating insert 1.

Advantageously, the wrapper 5 exhibits sufficient fluid-tightness for this, despite the porosity of the materials of which it may be made, such as, for example, kraft paper or a composite material made up of a fabric or mat of mineral fibers and a polymer matrix, and the bonded joints between the various wrapper portions 18, 19, 20. Thanks to this relative fluid-tightness, the pumping flow rate of the vacuum pump 24 is enough to create a vacuum pressure in the wrapper 5. Further, the pressing of the flange 27 against the wrapper 5 limits the leakage flow rate from the wrapper 5 at the orifice 28 through which the suction nozzle 25 passes. Thus, the wrapper 5 exhibits a leakage flow rate that is lower than the pumping flow rate of the vacuum pump 24 so that the suction produced by the vacuum pump 24 generates a vacuum pressure in the insulating insert 1. In other words, the head losses of the wrapper which are due to the porosity of the materials, possible imperfect bonding at the joins between the wrapper portions 18, 19, 20 and any leaking that may occur at the orifice 28 made in the wrapper for the insertion of the suction nozzle 25 are lower than the head losses created by the vacuum pump 25 and its suction nozzle 24, thereby allowing a vacuum pressure to be generated in the insulating insert 1.

The suction generated by the vacuum pump 24 has a suction flow rate of between 8 and 30 m3/h. As a preference, the pumping flow rate is 15 $m^3$/h and such a pumping flow rate of the vacuum pump 24 allows a vacuum pressure to be generated in the insulating insert 1 without the risk of the kraft paper wrapper 5 being damaged by too great a suction flow rate.

As a preference, the vacuum pump 24 comprises a filter to filter any glass wool fibers and dust from the central portion 11 that might be drawn up by the vacuum pump 24.

Furthermore, the suction produced by the vacuum pump is advantageously facilitated by inserting the suction nozzle 25 on a face situated on the edge face 9 of the insulating insert 1 parallel to the direction of layering 12 of the glass wool of the central portion 11. Specifically, inserting the suction nozzle 25 via such a face situated on the edge face 9 of the insulating insert 1 allows suction without head loss associated with the layering of the various laps of fibers that constitute the glass wool of the central portion 11.

Furthermore, an arrangement whereby the glass wool of the central portion 11 has a direction of layering 12 parallel to the thickness direction 10 of the insulating insert 1 allows the insulating insert 1 to be compressed by vacuum pressure in said thickness direction 10 more easily. In a preferred embodiment, the longitudinal compression of the insulating insert 1 is also made easier by the end portion or portions 50 of glass wool layered in the lengthwise direction of the insulating insert 1.

The presence of separators 17 in the core 4 makes the insulating insert 1 more rigid so that the compression of said insulating insert 1 becomes uniform.

The vacuum pressure in the insulating insert 1 produces a compression of the glass wool and therefore of the insulating insert 1. This compression of the glass wool 1 allows a reduction in thickness of the insulating insert 1. Typically, the insulating insert 1 is dimensioned to exhibit, in the unconstrained state, i.e., when not compressed, a thickness greater than or equal to the width of the inter-panel space 2 and, in the compressed state, a thickness smaller than said width of the inter-panel space 2. For example, in the context of an inter-panel space 2 of between 33 mm and 27 mm, the insulating insert 1 is dimensioned to exhibit an initial thickness, which is to say a thickness in the unconstrained state, of 35 mm and, in a compressed state, a thickness of 25 mm.

The insulating insert 1 is then inserted into the inter-panel space 2 between two adjacent insulating panels 3 of the thermally insulating barrier. As illustrated in FIG. 7 by the arrows 29, the insulating insert 1 is inserted into the inter-panel space 2 with its large faces 6 parallel to the lateral faces of the adjacent insulating panels 3 delimiting the inter-panel space 2. During this insertion, the suction nozzle 25 is kept in the insulating insert 1 and the vacuum pump 27 continuously generates a vacuum pressure in said insulating insert 1 in order to keep the insulating insert 1 in its compressed state. Keeping the insulating insert 1 in its compressed state makes it easier to insert it into the inter-panel space 2 because the insulating insert 1 then has a thickness smaller than the width of the inter-panel space 2.

The insulating insert 1 is inserted into the inter-panel space 2 in such a way that the edge face 9 through which the suction nozzle 25 passes faces toward the inside of the tank, thus making the assembly formed by the insulating insert 1 and the suction nozzle 25 easier to handle. Further, the insulating insert 1 is advantageously inserted into the inter-panel space 1 with a direction of stratification 12 parallel to the width of the inter-panel space 2. Moreover, the separators 17 are advantageously arranged in the insulating insert 1 in such a way as to be parallel to the support surface 30 formed by the insulating panels 3. In FIG. 7, such insulating panels 3 comprise a block of polyurethane foam 31 covered by a sheet of plywood 32 forming the support surface 30. Such an arrangement of the separators 17 limits convection through the glass wool of the central portion 11 in the tank wall.

Once the insulating insert 1 has been correctly positioned in the inter-panel space 2, the suction nozzle 25 is removed from the insulating insert 1. From that moment, the inside of the wrapper 5 is in communication with the external environment via the orifice 28. This communication allows the glass wool, because the vacuum pressure is no longer maintained in the insulating insert 1, to expand in the absence of a compressive constraint. The expansion of the glass wool increases the thickness of the insulating insert 1 so that the insulating insert 1 completely fills the inter-panel space 2, thus ensuring good continuity of the insulation of the thermally insulating barrier.

Figure 11:
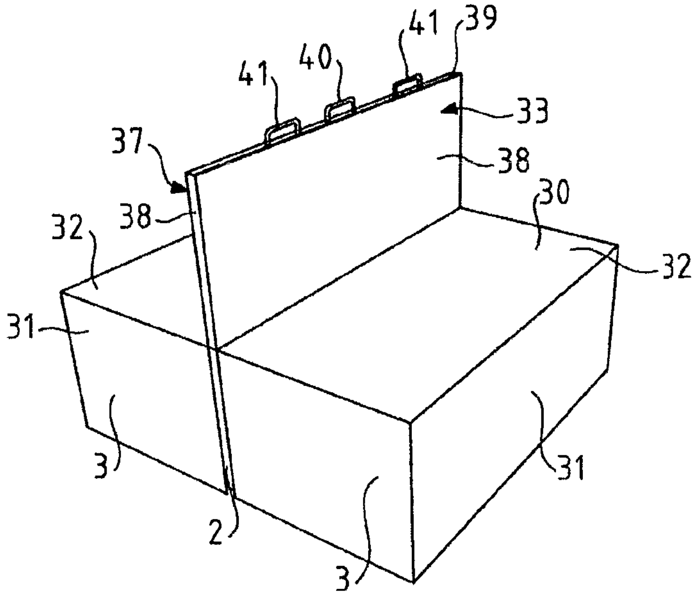
FIG. 11 is a schematic depiction of an insulating insert during the process of being inserted into an inter-panel space by means of a rigid guide.
Figure 12:
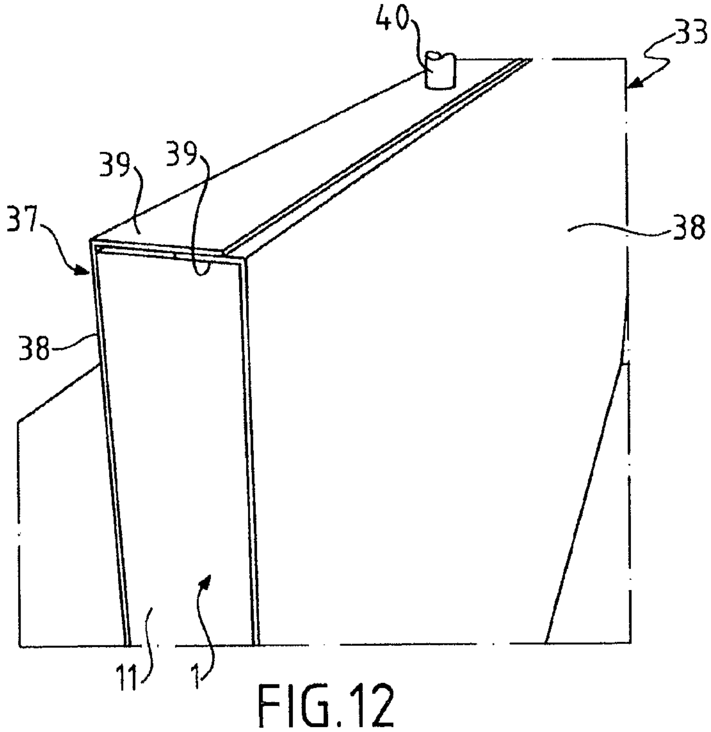
FIG. 12 is a partial detailed view of FIG. 11.

In an embodiment illustrated in FIGS. 11 and 12, a rigid guidance system may be used as a guide tool when inserting the insulating insert 1 into the inter-panel space 2.

Such a guidance system comprises a first rigid plate 33 and a second rigid plate 37. These two rigid plates 33, 37 are each of L-shaped cross section, the L being formed by a large rectangular face 38 and a return 39 extending perpendicular to the large face 38.

The large face 38 exhibits dimensions similar to the dimensions of the planar large faces 6 of the insulating insert 1.

An internal face of the return 39 of the first plate 33 has a handle 40. This handle is more or less centered in the longitudinal direction of said return 39.

The return 39 of the second plate 37 exhibits a cutout able to accept the handle 40 when the two plates 33, 37 are assembled as in FIG. 11. An internal face of the return 39 of the second plate 37 exhibits two handles 41. These handles 41 are arranged on each side of the cutout able to house the handle 40 of the first plate 33.

In order to insert the insulating insert 1 into the inter-panel space 2 using the rigid plates 33, 37, the insulating insert 1 is inserted between the two rigid plates 33, 37. More specifically, the large faces 6 of the insulating insert 1 are interposed and compressed between the large faces 38 of the rigid plates 33, 37. The returns 39 of the rigid plates are superposed in the thickness direction of the tank wall as illustrated in FIG. 12. This superposition is made possible by the handle 40 being housed in the cutout provided for that purpose in the return 39 of the second rigid plate 37.

The rigid plates 33, 37, between which the insulating insert 1 is held in its compressed state, may thus be inserted into the inter-panel space 2 with the insulating insert 1. Once the insulating insert 1 has been inserted into the inter-panel space 2, the rigid plates may be withdrawn using the handles 40, 41, thus releasing the insulating insert 1 from its compressed state and allowing it to expand to occupy the inter-panel space 2.

Figure 8:
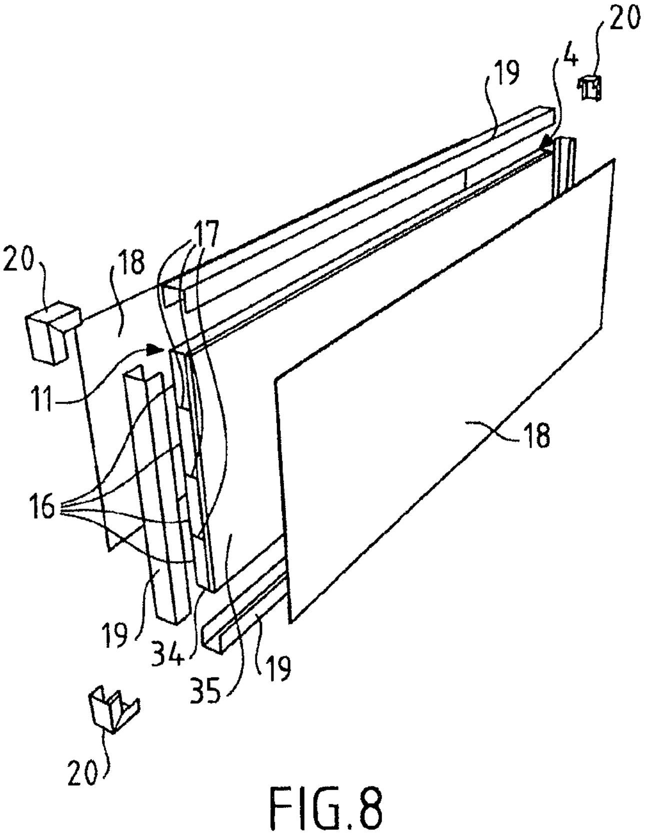
FIG. 8 is an exploded schematic perspective view of an insulating insert according to an embodiment variant.

FIG. 8 exhibits a variant embodiment of the insulating insert 1. In this first variant, elements that are identical to or perform the same function as those described hereinabove with reference to FIGS. 1 to 3 bear the same references.

This first variant differs from the insulating insert 1 illustrated in FIGS. 1 to 3 in that the central portion 11 of the insulating core 4 comprises two insulating layers superposed in the thickness direction of the insulating insert 1.

A first insulating layer 34 exhibits a structure analogous to the structure of the core described hereinabove with reference to FIGS. 1 to 3, namely a structure comprising sections 16 of the central portion 11 of layered glass wool which are separated by separators 17 made of kraft paper. Said layered glass wool sections 16 exhibit a direction of layering of the glass wool parallel to the support surface 30 formed by the insulating panels 3, preferably parallel to the width of the inter-panel space 2, namely parallel to the thickness direction 10 of the insulating insert 1.

A second insulating layer 35 comprises a single layer of layered glass wool. The direction of layering of the layered glass wool that forms this second layer 35 is parallel to the support surface 30 formed by the insulating panels 3 and preferably parallel to the thickness direction 10 of the insulating insert 1.

Figure 14:
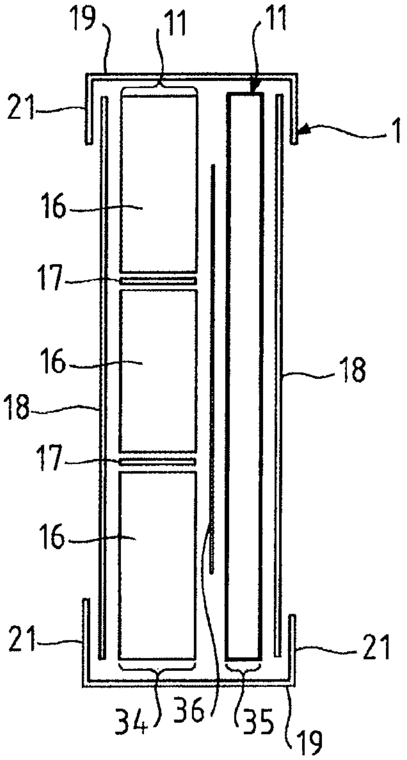
FIG. 14 is a view in section of an insulating insert according to an embodiment variant.

The first insulating layer 34 and the second insulating layer 35 are separated by a separation layer 36. This separation layer 36 is for example made of glass fabric or kraft paper. To improve the compressibility of the insulating insert 1 in its lengthwise and widthwise directions, this separation layer 36 is preferably shortened in these two dimensions, as partially depicted in FIG. 14.

The first insulating layer 34 exhibits a layered glass wool of density greater than the density of the layered glass wool of the second insulating layer 35. For example, the layered glass wool of the first insulating layer 34 exhibits a density of 35 to 40 $kg/m^3$ and the layered glass wool of the second insulating layer 35 exhibits a density of 22 $kg/m^3$.

Figure 9:
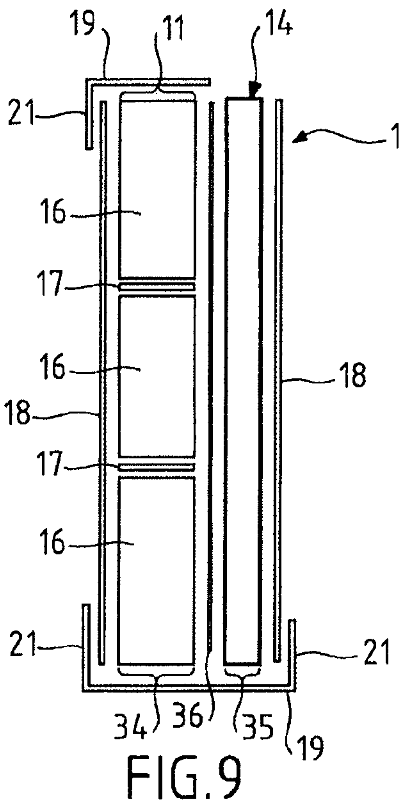
FIG. 9 is a view in section through an insulating insert according to another embodiment variant.

FIG. 9 depicts a second variant embodiment of the insulating insert 1. In this second variant, the elements that are identical to or perform the same function as those described hereinabove with reference to FIGS. 1 to 3 bear the same references.

This second variant differs from the first variant illustrated in FIG. 8 in that the wrapper 5 does not completely cover the insulating core 4. Specifically, in this FIG. 9, the second insulating layer 35 is not covered on an edge face 9 of the insulating insert 1. In other words, one of the rectilinear edge-face wrapper portions 19 covers only the first insulating layer 34 and has just one return 21, said return 21 being bonded to the planar wrapper portion 18 that covers the first insulating layer 34.

An insulating insert 1 according to the variants illustrated in FIGS. 8 and 9 offers good capacity for compression and expansion thanks to the second insulating layer 35 but maintains enough rigidity to allow it to deform uniformly and limit the convection through the layered glass wool thanks to its first insulating layer 34. Thus, such an insulating insert 1 can easily be deformed by compression to facilitate its insertion into the inter-panel space 2 while at the same time completely filling said inter-panel space 2 when the compression is no longer maintained and thereby avoiding convection in the thermally insulating barrier. This compression may be achieved through the use of a suction system such as a vacuum pump 24 in the case of an insulating insert 1 like the one according to FIG. 8, in which the wrapper 5 completely covers the insulating core 4, thus offering enough fluid-tightness to compress under the effect of a vacuum pressure. This compression may, on the other hand, be achieved without a suction system in the case of an insulating insert as depicted in FIG. 9, in which the wrapper 5 does not completely cover the insulating core 4.

The above-described technique for creating a sealed and thermally insulating tank can be used in various types of reservoirs, in order for example to constitute the secondary insulating barrier and/or the primary insulating barrier of an LNG reservoir in an on-shore facility or in a floating structure such as a methane carrier ship or the like.

Figure 10:
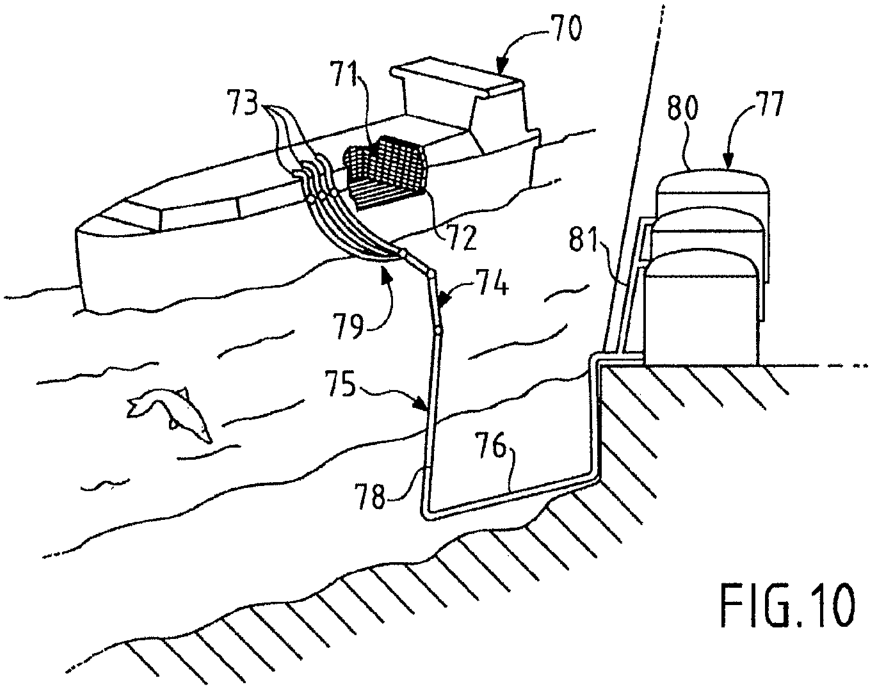
FIG. 10 is a schematic depiction with cutaway of a tank of a methane carrier ship and of a terminal for loading/offloading from this tank.

With reference to FIG. 10, a cut away view of a methane carrier ship 70 shows a sealed and insulated tank 71 of prismatic overall shape mounted in the double hull 72 of the ship. The wall of the tank 71 comprises a primary sealing barrier intended to be in contact with the LNG contained in the tank, a secondary sealing barrier arranged between the primary sealing barrier and the double hull 72 of the ship, and two insulating barriers arranged respectively between the primary sealing barrier and the secondary sealing barrier, and between the secondary sealing barrier and the double hull 72.

In a way known per se, loading/offloading pipelines 73 located on the upper deck of the ship can be coupled, through appropriate connectors, to a maritime or harbor terminal for transferring a cargo of LNG from or to the tank 71.

FIG. 10 depicts an example of a maritime terminal comprising a loading and offloading station 75, an underwater pipe 76 and an onshore facility 77. The loading and offloading station 75 is a fixed offshore installation comprising a mobile arm 74 and a tower 78 supporting the mobile arm 74. The mobile arm 74 carries a bundle of insulated flexible hoses 79 which can be connected to the loading/offloading pipelines 73. The orientable mobile arm 74 is able to adapt to all sizes of methane carrier ship. A connecting pipe, not depicted, extends inside the tower 78. The loading and offloading station 75 allows the methane carrier ship 70 to be loaded and offloaded from or to the onshore facility 77. The latter comprises liquefied gas storage tanks 80 and connecting pipes 81 connected by the underwater pipe 76 to the loading or offloading station 75. The underwater pipe 76 allows liquefied gas to be transferred between the loading or offloading station 75 and the onshore facility 77 over a long distance, for example 5 km, allowing the methane carrier ship 70 to be kept standing off the coast by a long distance during the loading and offloading operations.

In order to generate the pressure needed for transferring the liquefied gas, use is made of pumps carried on board the ship 70 and/or pumps with which the onshore facility 77 is equipped and/or pumps with which the loading and offloading station 75 is equipped.

Although the invention has been described in connection with a number of particular embodiments, it is quite obvious that it is not in any way restricted thereto and that it comprises all technical equivalents of the means described and combinations thereof where these fall within the scope of the invention as defined by the claims.

The use of the verbs "to comprise" or "to include" and of the conjugated forms thereof does not exclude the presence of elements or steps other than those listed in a claim.

The invention claimed is:

1. A sealed and thermally insulating tank wall comprising a thermal insulating barrier defining a planar support surface and a sealing membrane resting on said planar support surface of the thermally insulating barrier, the thermally insulating barrier comprising a plurality of insulating panels juxtaposed in a regular pattern, mutually facing lateral faces of two adjacent insulating panels jointly delimiting an inter-panel space separating said two adjacent insulating panels, the tank wall further comprising an insulating insert arranged in the inter-panel space so as to fill said inter-panel space, said insulating insert comprising an insulating core at least partially covered by a wrapper, at least a central portion of said insulating core comprising layered glass wool, said layered glass wool comprising laps of fibers superposed in a direction of layering, the insulating insert being arranged in the inter-panel space in such a way that the direction of layering of said central portion is parallel to a width wise direction of the inter-panel space.

2. The sealed and thermally insulating tank wall as claimed in claim 1, wherein a lengthwise direction of the insulating core extends in a lengthwise direction of the inter-panel space and said insulating core comprises, at least at one of the longitudinal ends of the central portion, at least an end portion comprising layered glass wool, said end portion comprising laps of fibers superposed in a direction of layering parallel to the lengthwise direction of the insulating insert.

3. The sealed and thermally insulating tank wall as claimed in claim 1, wherein a lengthwise direction of the insulating insert extends in a lengthwise direction of the inter-panel space and said insulating insert comprises, at least at one of the longitudinal ends, at least one end piece comprising layered glass wool comprising laps of fibers superposed in a direction of layering parallel to the lengthwise direction of the insulating insert, said end piece being separated from the insulating core by the wrapper.

4. The sealed and thermally insulating tank wall as claimed in claim 1, wherein the insulating core comprises at least one separator extending in a plane perpendicular to a thickness direction of the tank wall, said separator separating the layered glass wool of the central portion into a plurality of layered glass wool sections aligned in said thickness direction of the tank.

5. The sealed and thermally insulating tank wall as claimed in claim 4, wherein the insulating core comprises a plurality of separators separating the layered glass wool of the central portion into a plurality of layered glass wool sections aligned in the thickness direction of the tank wall, said separators being spaced apart by 5 to 20 cm in the thickness direction of the tank wall.

6. The sealed and thermally insulating tank wall as claimed in claim 1, wherein the insulating core comprises a layered glass wool exhibiting a density of between 20 and 45 kg/m3.

7. The sealed and thermally insulating tank wall as claimed in claim 1, wherein the central portion of the insulating core comprises a first insulating layer of layered glass wool and a second insulating layer of layered glass wool, the first insulating layer and the second insulating layer being superposed in the widthwise direction of the inter-panel space, the layered glass wool of the first and the second insulating layers exhibiting a direction of layering parallel to the widthwise direction of the inter-panel space, the first insulating layer and the second insulating layer being separated by a separating lap extending parallel to the faces of the two insulating panels.

8. The sealed and thermally insulating tank wall as claimed in claim 7, wherein the layered glass wool of the first insulating layer exhibits a density higher than the density of the layered glass wool of the second insulating layer.

9. The sealed and thermally insulating tank wall as claimed in claim 7, wherein a widthwise direction of the insulating insert extends in a thickness direction of the tank wall, the separating lap being smaller than the insulating layers in the lengthwise direction of the insulating insert.

10. The sealed and thermally insulating tank wall as claimed in claim 1, wherein the wrapper completely surrounds the insulating core.

11. The sealed and thermally insulating tank wall as claimed in claim 1, wherein the wrapper comprises a plurality of wrapper portions bonded to one another and/or bonded to the insulating core.

12. The sealed and thermally insulating tank wall as claimed in claim 1, wherein at least a portion of the wrapper comprises a material selected from sheets of polymer, composite sheets including mineral fibers and a polymer matrix, composite sheets including mineral fibers bonded to a sheet of paper or of polymer, and combinations thereof.

13. The sealed and thermally insulating tank wall as claimed in claim 12, wherein said sheet of polymer or said composite sheet is bonded to the insulating core by a coat of adhesive located between said sheet of polymer or said composite sheet and the insulating core.

14. The sealed and thermally insulating tank wall as claimed in claim 1, wherein the wrapper comprises planar wrapper portions extending perpendicular to the widthwise direction of the inter-panel space on each side of the insulating core.

15. The sealed and thermally insulating tank wall as claimed in claim 14, wherein at least one of the planar wrapper portions comprises a composite sheet including mineral fibers and a polymer matrix.

16. The sealed and thermally insulating tank wall as claimed in claim 15, wherein the mineral fibers are in the form of a fabric or of a mat.

17. The sealed and thermally insulating tank wall as claimed in claim 16, wherein the fabric or mat of mineral fibers is impregnated or coated with the polymer matrix.

18. The sealed and thermally insulating tank wall as claimed in claim 16, wherein the polymer matrix comprises a sheet of polymer covering the mineral fibers on at least one of the two faces of the fabric or mat of mineral fibers.

19. The sealed and thermally insulating tank wall as claimed in claim 18, wherein the sheet of polymer covering the mineral fibers is bonded to said fabric or mat of mineral fibers using a thermofusing or spot bonding method.

20. The sealed and thermally insulating tank wall as claimed in claim 18, wherein the sheet of polymer covering the fabric or mat of mineral fibers is made from a resin selected from the group consisting of polyethylene, polypropylene, polyethylene terephthalate and polyvinyl chloride.

21. The sealed and thermally insulating tank wall as claimed in claim 18, wherein the sheet of polymer exhibits a surface density of between 10 and 100 g/m$^2$.

22. The sealed and thermally insulating tank wall as claimed in claim 15, wherein the composite sheet is covered with a sheet of polymer.

23. The sealed and thermally insulating tank wall as claimed in claim 15, wherein the composite sheet is covered with a sheet of paper.

24. The sealed and thermally insulating tank wall as claimed in claim 14, wherein the mineral fibers are selected from the group consisting of glass fibers and basalt fibers.

25. The sealed and thermally insulating tank wall as claimed in claim 14, wherein at least one of the planar wrapper portions comprises kraft paper.

26. The sealed and thermally insulating tank wall as claimed in claim 14, wherein the wrapper comprises an edge-face wrapper portion extending in the widthwise direction of the inter-panel space between the planar wrapper portions situated on each side of the insulating core, said edge-face wrapper portion being located along all or part of the perimeter of the insulating core.

27. The sealed and thermally insulating tank wall as claimed in claim 26, wherein the edge-face wrapper portion comprises rectilinear edge-face portions and corner edge-face portions.

28. The sealed and thermally insulating tank wall as claimed in claim 26, wherein the edge-face wrapper portion comprises kraft paper.

29. The sealed and thermally insulating tank wall as claimed in claim 26, wherein the edge-face wrapper portion comprises a sheet of polymer.

30. The sealed and thermally insulating tank wall as claimed in claim 29, wherein the sheet of polymer is adhesive.

31. The sealed and thermally insulating tank wall as claimed in claim 1, wherein the difference in coefficient of thermal contraction between the coefficient of thermal contraction of the insulating core and the coefficient of thermal contraction of the wrapper is less than or equal to $15\times10^{-6}$/K.

32. The sealed and thermally insulating tank wall as claimed in claim 1, wherein the insulating panels of the thermally insulating barrier comprise blocks of polyurethane foam.

33. A ship for transporting a liquid product, the ship comprising a double hull and a tank located in the double hull, the tank comprising a sealed and thermally insulating tank wall as claimed in claim 1.

34. A transfer system for a liquid product, the system comprising a ship as claimed in claim 33, insulated pipelines arranged in such a way as to connect the tank installed in the hull of the ship to a floating or on-shore storage facility and a pump for forcing a flow of liquid product through the insulated pipelines from or to the floating or on-shore storage facility to or from the tank of the ship.

35. A method for loading or offloading a ship as claimed in claim 33, wherein a liquid product is conveyed through insulated pipelines from or to a floating or onshore storage facility to or from the tank of the ship.

* * * * *